(12) United States Patent
Rahn et al.

(10) Patent No.: US 9,117,614 B2
(45) Date of Patent: Aug. 25, 2015

(54) CIRCUIT INTERCONNECT ATTACHING APPARATUS, ATTACHING ASSEMBLIES, AND METHODS OF CONNECTING CIRCUIT INTERCONNECT DEVICES

(71) Applicants: Megan Rahn, Dallas, TX (US); Brian D. Campbell, Coppell, TX (US); Russell J. Wedemeyer, Colleyville, TX (US); Thomas W. Hawkins, Carrollton, TX (US)

(72) Inventors: Megan Rahn, Dallas, TX (US); Brian D. Campbell, Coppell, TX (US); Russell J. Wedemeyer, Colleyville, TX (US); Thomas W. Hawkins, Carrollton, TX (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 119 days.

(21) Appl. No.: 14/017,629

(22) Filed: Sep. 4, 2013

(65) Prior Publication Data
US 2015/0064949 A1 Mar. 5, 2015

(51) Int. Cl.
*H02B 1/04* (2006.01)
*H01R 4/60* (2006.01)
*H01H 71/08* (2006.01)
*H02B 1/20* (2006.01)
*H01R 43/26* (2006.01)
*H01R 9/26* (2006.01)
*H01R 25/14* (2006.01)

(52) U.S. Cl.
CPC .............. *H01H 71/08* (2013.01); *H01R 4/60* (2013.01); *H02B 1/04* (2013.01); *H02B 1/20* (2013.01); *H01R 9/2608* (2013.01); *H01R 25/142* (2013.01); *H01R 43/26* (2013.01)

(58) Field of Classification Search
CPC ................................. H02B 1/04; H02B 1/052
USPC ......... 361/601, 637, 648, 640, 656, 652, 673, 361/622, 624, 626–628, 631; 439/212, 251, 439/213, 949
See application file for complete search history.

(56) References Cited

U.S. PATENT DOCUMENTS

| | | | | |
|---|---|---|---|---|
| 4,181,924 A | * | 1/1980 | Thomas et al. | 361/634 |
| 4,742,608 A | * | 5/1988 | M'Sadoques et al. | 29/453 |
| 5,030,108 A | * | 7/1991 | Babow et al. | 439/64 |
| 5,126,918 A | * | 6/1992 | Morby et al. | 361/644 |
| 5,894,405 A | * | 4/1999 | Fleege et al. | 361/634 |
| 7,813,110 B1 | * | 10/2010 | Rezac | 361/624 |
| 8,873,223 B2 | * | 10/2014 | Rahn et al. | 361/610 |
| 2013/0048477 A1 | | 2/2013 | Campbell | |

* cited by examiner

*Primary Examiner* — Abdullah Riyami
*Assistant Examiner* — Harshad Patel

(57) ABSTRACT

A circuit interconnect attaching apparatus is disclosed. The circuit interconnect attaching apparatus has a body adapted to couple to a circuit interconnect device, the body having a first end and a second end, one or more frame connector coupled to the first end of the body, at least one tab portion positioned on an outer surface of the second end of the body, wherein the at least one tab portion for accepting at least one fastener member, and one or more bus connector configured to connect to or disconnect from one or more bus bar that is responsive to rotation of the circuit interconnect device. The circuit interconnect attaching assemblies having the circuit interconnect attaching apparatus and methods of connecting circuit interconnect devices to one or more bus bar are disclosed, as are other aspects.

22 Claims, 18 Drawing Sheets

CIRCUIT INTERCONNECT ATTACHING APPARATUS, ATTACHING ASSEMBLIES, AND METHODS OF CONNECTING CIRCUIT INTERCONNECT DEVICES

FIELD

The present invention relates to circuit interconnect attaching apparatus and methods thereof, and more specifically to apparatus adapted to engage or disengage devices (e.g., circuit breakers) from one or more bus bar.

BACKGROUND

Circuit breakers can connect to one or more bus bar in panelboards or switchboards and may be used to protect connected electrical circuits. In certain cases, mechanisms may be used to aid in the installation of the circuit breakers to bus bars installed in the panelboards or switchboards. However, existing mechanisms are generally not versatile in that they provide for connection only in limited configurations, and may be difficult or time consuming to install and/or remove. Furthermore, once installed, they may not be securely held in place.

Thus, improved devices for installation and/or removal of electrical circuit breakers from one or more bus bar are desired.

SUMMARY

In a first embodiment, a circuit interconnect attaching apparatus is provided. The circuit interconnect attaching apparatus includes a body adapted to couple to a circuit interconnect device, the body having a first end and a second end, one or more frame connector coupled to the first end of the body, at least one tab portion positioned on an outer surface of the second end of the body, wherein the at least one tab portion can be adapted for accepting at least one fastener member, one or more bus connector configured to connect to or disconnect from one or more bus bar that can be responsive to a rotational motion of the body and the circuit interconnect device.

An aspect of the circuit interconnect attaching apparatus may include the circuit interconnect device that can be selected from a group consisting of at least one circuit breaker, at least one switch, at least one branch circuit monitor, at least one surge protection device, and at least one lug.

Another aspect may include one or more line side bus conductor bar strap coupled to the one or more bus connector. Still another aspect may include one or more load connector configured to connect to or disconnect from one or more load conductor that can be responsive to rotation of the body and the circuit interconnect device. It is possible an aspect may comprise of one or more line side bus conductor bar strap coupled to the one or more bus connector, and one or more load conductor bar strap coupled to the one or more load connector.

Another aspect of the circuit interconnect attaching apparatus may include the body comprising at least one pocket configured to receive one or more bus conductor bar strap that can be coupled to the one or more bus connector. Further, an aspect may include the body comprising at least one insulator sheath that can be adapted to at least partially surround the one or more bus connector. Further still, an aspect may include the body comprising one or more pocket, each pocket can be configured to receive a bus conductor bar strap, and one or more opening from the one or more pocket that can be configured to receive the one or more bus connector.

It is possible that the at least one tab portion can include a cavity having a first opening and a second opening that can be adapted for the at least one fastener member to enter there through. It is possible the tab portion can be positioned on the second end of the body. Further, an aspect may include the at least one fastening member can be from the group consisting of one of a bolt, a captive fastener, a quarter turn member, a ball detent pin, or a securing clip device.

Another aspect may include the circuit interconnect device including: one or more line terminal connected to one or more bus conductor bar strap; and one or more load terminal coupled to one or more load conductor bar strap, such that the one or more load conductor bar strap can be coupled to one or more load connector.

In an assembly embodiment, a circuit interconnect attaching assembly is provided. The circuit interconnect attaching assembly can include a body adapted to be coupled to a circuit interconnect device, the body can include at least one tab portion coupled to an outer surface of the body, one or more frame connector can be coupled to a first end of the body, one or more bus connector can be configured to connect to one or more bus bar responsive to a rotational motion of the body and the circuit interconnect device, a universal circuit interconnect device frame rail assembly can be included for securing the body and the circuit interconnect device, a first frame rail of the universal circuit interconnect device frame rail assembly can comprise at least one hole or slot adapted to receive the one or more frame connector at the first end of the body, and a second frame rail of the universal circuit interconnect device frame rail assembly can have one or more hole or slot for accepting at least one fastener member for securing the body and circuit interconnect device to the second frame rail via the at least one tab portion positioned on an outer surface of a second end of the body, the at least one fastener member can be coupled to an axis generally perpendicular to a mating surface of the second frame rail.

An aspect of the circuit interconnect attaching assembly can include the at least one fastener member that can be in communication with the at least one opening and a cavity of the second frame rail while coupled to the second frame rail. Further, the at least one tab portion may include a cavity having a first opening and a second opening for the at least one fastener member to be in communication while coupled to the second frame rail. Further, another aspect of the universal circuit interconnect device frame rail assembly may be adapted for securing a plurality of circuit interconnect devices onto the second frame rail by offsetting one or more tab portion location of a first circuit interconnect device with a second tab portion location of a second circuit interconnect device. Thus, the fastener of the one first circuit interconnect device assembly attaches onto the second frame rail at a location offset from the second fastener of a second circuit interconnect device onto the second frame rail.

It is possible the circuit interconnect attaching assembly may comprise one or more load connector configured to connect to or disconnect from one or more load conductor responsive to a rotational motion of the body and the circuit interconnect device.

Further, the circuit interconnect attaching assembly may comprise a shutter apparatus that is configured and operational to be opened or closed by a rotational motion of the body.

It is possible that the circuit interconnect attaching assembly can include a circuit interconnect device having one of one or more line terminal, one or more load terminal, or both, wherein the one or more load terminal can be in communication with one or more load strap, and one or more bus conductor bar strap can be connected to the one or more line terminal.

In a method embodiment, a method of connecting a circuit interconnect device is provided. The method of connecting a circuit interconnect device includes providing the circuit interconnect device having one of one or more load terminal, one or more line terminal, or both, providing a body coupled to the circuit interconnect device, the body having one or more frame connector coupled to a first end and at least one tab portion coupled to a second end, providing at least one fastener member in communication with the at least one tab portion, providing one or more bus connector configured to connect to one or more bus bar, providing a universal circuit interconnect device frame rail assembly for securing the body and the circuit interconnect device, the universal circuit interconnect device frame rail assembly including a first frame rail having at least one hole or slot, and a second frame rail having at least one hole or slot, engaging the first frame rail with the one or more frame connector at the first end of the body, rotating the body and the circuit interconnect device in a rotational motion or pivoting motion for the one or more bus connector to engage with and connect to the one or more bus bar, and engaging the second frame rail with the at least one fastener member for securing the body and circuit interconnect device to the second frame rail, the at least one fastener member coupled to an axis generally perpendicular to a mating surface of the second frame rail.

Still other aspects, features, and advantages of the present subject matter disclosed in the application may be readily apparent from the following detailed description by illustrating a number of example embodiments and implementations, including the best mode contemplated for carrying out the disclosed subject matter. The disclosed subject matter may also be capable of other and different embodiments, and its several details may be modified in various respects, all without departing from the scope of the disclosed subject matter. Accordingly, the drawings and descriptions are to be regarded as illustrative in nature, and not as restrictive. The subject matter disclosed is to cover all modifications, equivalents, and alternatives falling within the scope of the disclosed subject matter.

DESCRIPTION

Figure 1A:
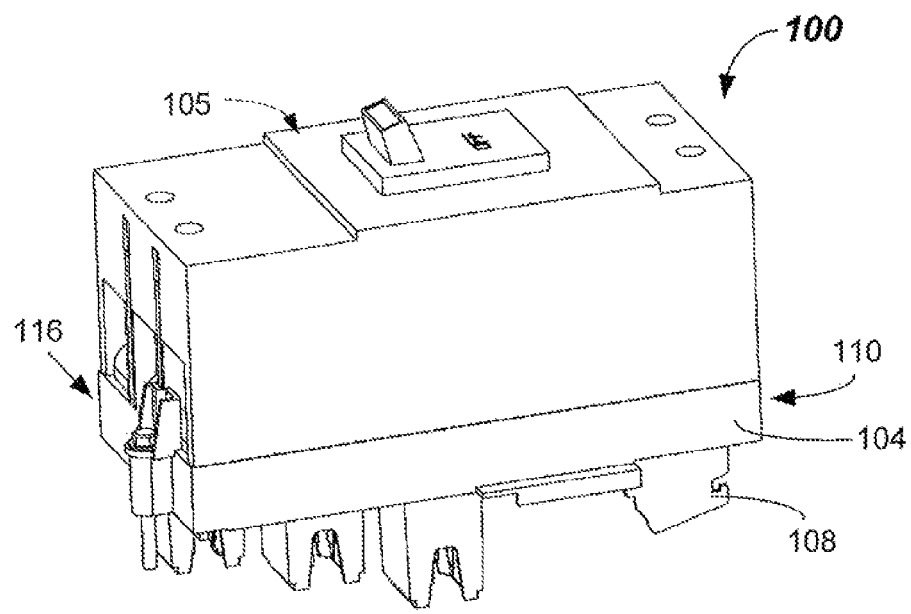
FIG. 1A illustrates a top isometric view of a circuit interconnect attaching apparatus having a coupled circuit interconnect device according to embodiments.

Embodiments of the circuit interconnect attaching apparatus are useful for electrically connecting or disconnecting a circuit interconnect device to or from one or conductor bar, such as one or more bus bar. Embodiments of the circuit interconnect attaching apparatus are especially adapted for use in switchboards or panelboards to facilitate the rapid installation of one or more circuit interconnect device therein. The term "circuit interconnect device" as used herein means an electrical device adapted to carry electrical current and/or break (e.g., electrically open) an electrical circuit, electrically close an electrical circuit, limit an amplitude of electrical current in an electrical circuit, or monitor one or more electrical characteristic of a circuit (e.g., electrical current or power supplied to a circuit, or voltage relative to an electrical ground or another part of the circuit). The circuit interconnect device, in some embodiments, is one selected from a group consisting of a circuit breaker, an electrical switch, a branch circuit monitor, a surge protection device, and a lug. The circuit interconnect device may either break (e.g., electrically open) an electrical circuit or close an electrical circuit such as by separation and closing of electrical contacts therein. Such contact separation may be by mechanical tripping devices causing separation, electro-mechanical devices causing separation, manual tripping such as by moving (e.g., throwing a lever), or automated tripping devices. Current may be limited in circuit interconnect devices that are, for example, surge protection devices. Current and/or voltage, or various combinations or mathematical functions thereof (derivatives), may be monitored by the circuit interconnect device comprising a branch circuit monitor. Other types of circuit interconnect devices may be used.

The circuit interconnect attaching apparatus may be used to quickly connect or disconnect a circuit interconnect device from one or more bus bar. Bus bars are electrical conduits adapted to carry one or more phase of electricity, such as an A, B, and/or C phases. The circuit interconnect attaching apparatus may be used with various sizes and types of circuit interconnect devices (e.g., circuit breaker, an electrical switch, a branch circuit monitor, a surge protection device, and a lug, or the like) and may be used to install the circuit interconnect devices in different orientations on a panelboard or switchboard. For example, the circuit interconnect attaching apparatus may be used to install a circuit interconnect device in either the front or rear-connected configuration. The term install is used herein and means connecting (e.g., plugging into) a circuit interconnect device to one or more conductor bar (e.g., one or more bus bar and/or one or more load bar). The circuit interconnect attaching apparatus allows the installation or removal of the circuit interconnect device without disturbing other switchboard or panelboard components. Embodiments may allow connection to one or more set of bus bars and may be adapted for uses with relatively medium or smaller circuit interconnect devices. In some embodiments, the circuit interconnect attaching apparatus may facilitate connection to both line side conductors (e.g., bus bars) and one or more load side conductor (e.g., runback or load lug assembly).

In view of the foregoing, circuit interconnect attaching apparatus, circuit interconnect attaching assemblies, and methods of connecting circuit interconnect devices are provided.

According to one or more embodiment, a circuit interconnect attaching apparatus is provided. The circuit interconnect attaching apparatus includes a body adapted to couple to a circuit interconnect device, the body having a first end and a second end, one or more frame connector coupled to the first end of the body, at least one tab portion positioned on an outer surface of the second end of the body, wherein the at least one tab portion can be adapted for accepting at least one fastener member, one or more bus connector configured to connect to or disconnect from one or more bus bar that can be responsive to a rotational motion of the body and the circuit interconnect device.

These and other embodiments of the circuit interconnect attaching apparatus, circuit interconnect attaching assemblies, and methods of connecting circuit interconnect devices to one or more bus bar are described below with reference to FIGS. 1A-10. The drawings are not necessarily drawn to scale. Like numerals are used throughout to denote like elements.

Referring to FIGS. 1A through 1I, a circuit interconnect attaching apparatus 100 and its various components are shown. The circuit interconnect attaching apparatus 100 has a body 104 adapted to couple to a circuit interconnect device 105. The body 104 may be a separate component, as shown, to which the circuit interconnect device 105 is secured and coupled by means of one or more fastener (e.g., screws, bolts, rivets, ultrasonic welding, adhesive, snaps or the like). Optionally, the body 104 may be made integral with a molded case of the circuit interconnect device 105. The body 104 includes a first end 110 and a second end 116.

Figure 1B:
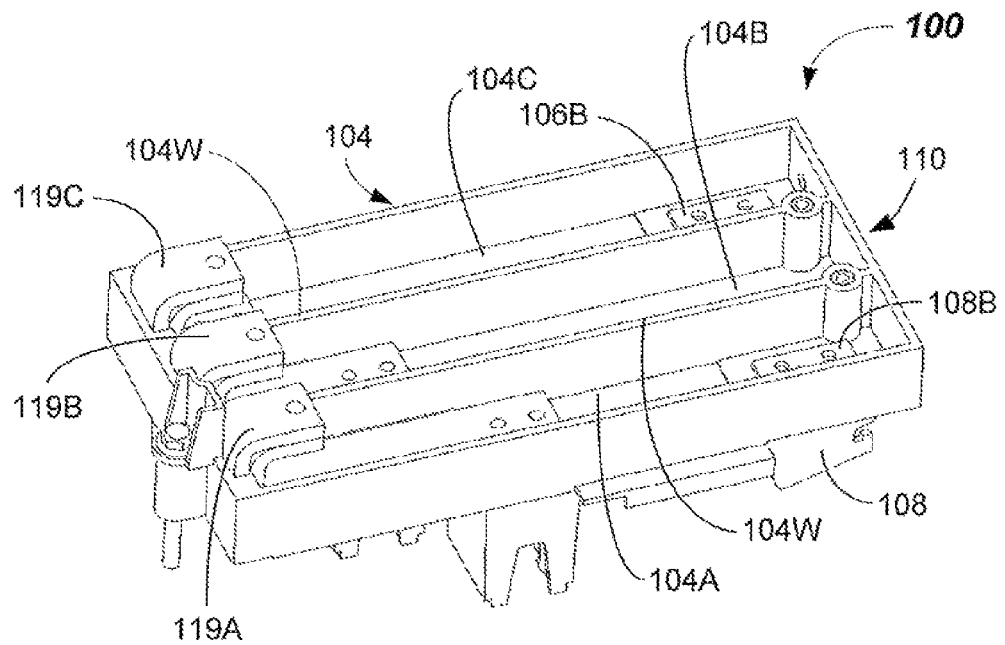
FIG. 1B illustrates a top isometric view of a circuit interconnect attaching apparatus with the circuit interconnect device removed according to embodiments.
Figure 1C:
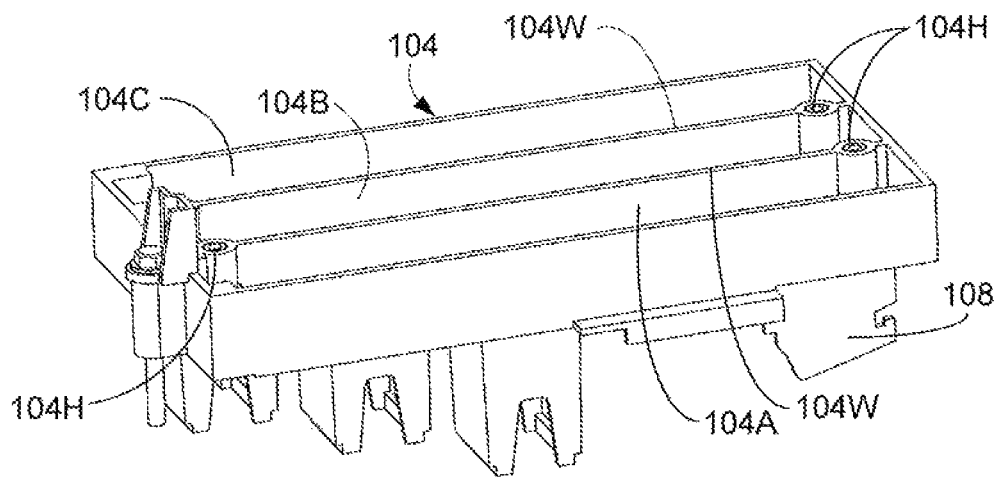
FIG. 1C illustrates a top isometric view of a body of a circuit interconnect attaching apparatus according to embodiments.
Figure 1D:
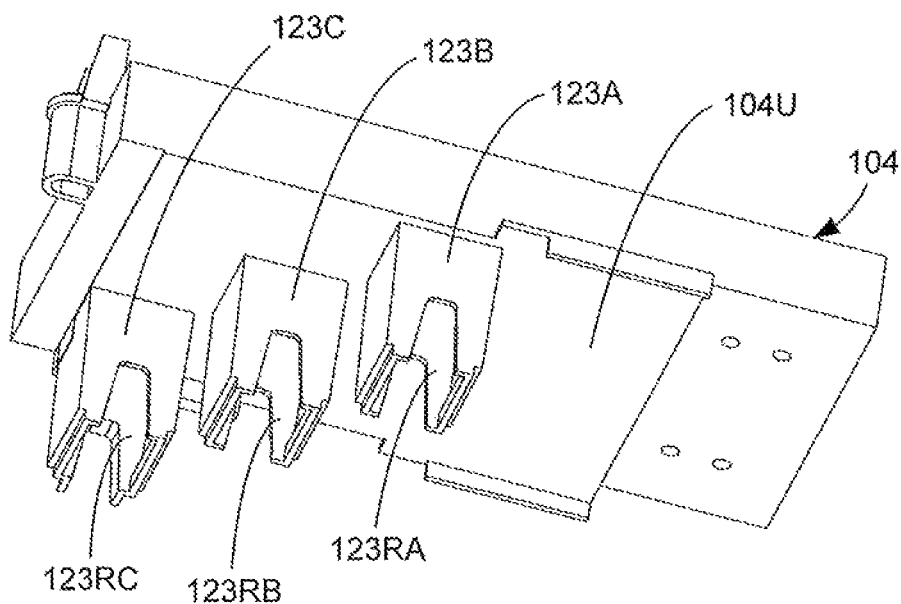
FIG. 1D illustrates a bottom isometric view of a body of a circuit interconnect attaching apparatus according to embodiments.
Figure 1E:
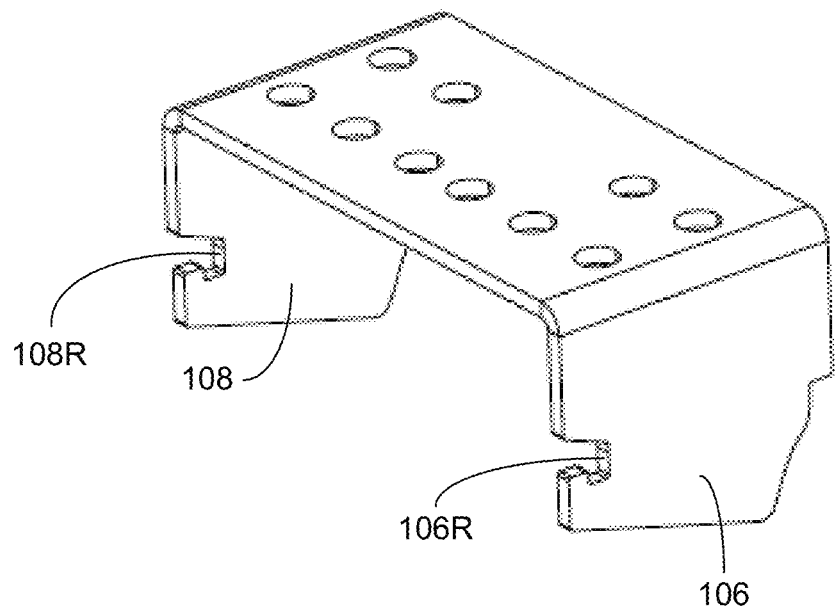
FIG. 1E illustrates an isometric view of an integral left and right frame connector of a circuit interconnect attaching apparatus according to embodiments.
Figure 1F:
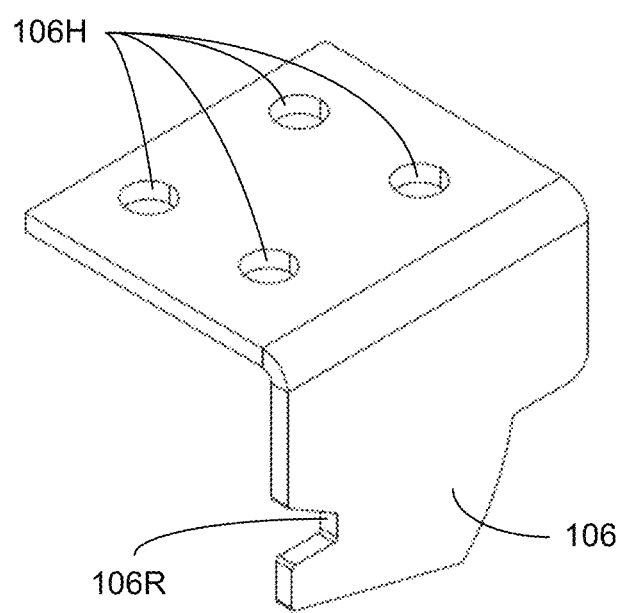
FIG. 1F illustrates an isometric view of a left frame connector of a circuit interconnect attaching apparatus according to embodiments.
Figure 1G:
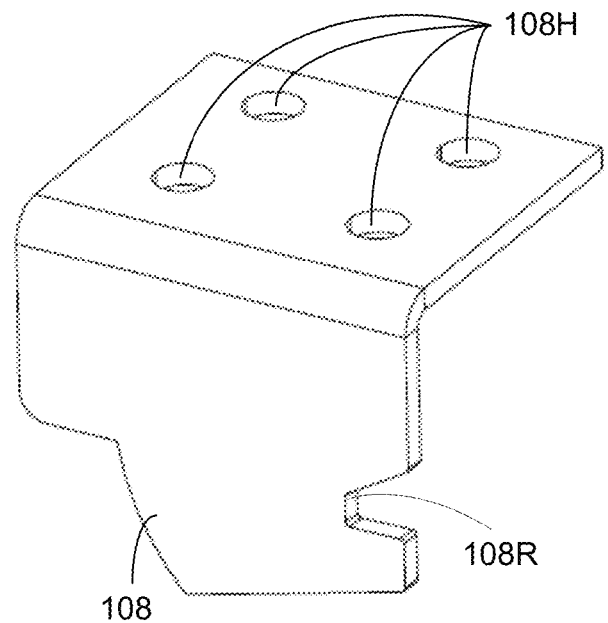
FIG. 1G illustrates an isometric view of a right frame connector of a circuit interconnect attaching apparatus according to embodiments.

Still referring to FIGS. 1A through 1I, the circuit interconnect attaching apparatus 100 has one or more frame connector 106, 108 coupled to the body 104 at the first end 110. The frame connectors 106, 108 may be manufactured from bent sheet metal (e.g., steel) as shown in FIGS. 1E-1G. In the depicted embodiment, the frame connectors 106, 108 may each have a laterally-oriented recess 106R, 108R (FIGS. 1E-1G) that are adapted to couple to and engage with a frame rail (e.g. frame rail 225—FIG. 2C), as will be discussed later herein. The frame connectors 106, 108 may be connected to the body 104 by suitable fasteners (e.g., screws, rivets, or the like) by being received into holes 106H, 108H and threading into the body 104 or by passing through the holes 106H, 108H and holes in the body 104 and threading into a backing plate 106B, 108B (FIG. 1B). The laterally-oriented recesses 106R, 108R may be notches or the like. Other embodiments may include notches having a hook shape, such as shown in FIG. 1A. In some embodiments, the frame connectors 106, 108 may be molded integrally with the body 104 and be made of a same plastic as the body 104. Body 104 may be molded of any suitable plastic, such as a thermoset plastic.

Figure 1H:
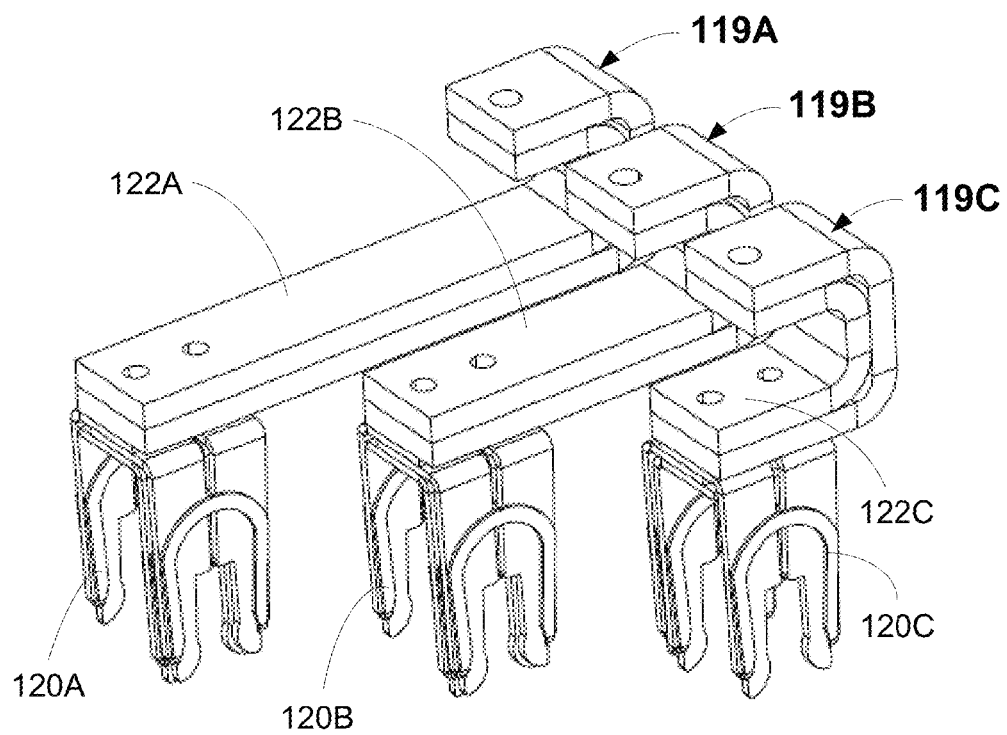
FIG. 1H illustrates isometric views of a line conductor assembly of a circuit interconnect attaching apparatus according to embodiments.

Referring to FIGS. 1H and 2A-C, to electrically connect the circuit interconnect device 105 to the one or more bus bar 124A, 124B, 124C (see FIGS. 2A-C), the circuit interconnect attaching apparatus 100 also has one or more conductor assembly 119A, 119B, 119C (FIG. 1B, 1H). The one or more conductor assembly 119A, 119B, 119C has one or more bus connector 120A, 120B, 120C (e.g., spring-loaded clips) (FIG. 1H) adapted to electrically connect to one or more conductor bar (e.g., bus bars 124A, 124B, 124C of FIGS. 2A-C) and one or more conductor bus bar strap 122A, 122B, 122C adapted to couple to the line side (e.g., line side terminals) of the circuit interconnect device 105. For a three phase breaker (shown), the circuit interconnect attaching apparatus 100 will have three conductor assemblies 119A, 119B, and 119C as shown (FIG. 1H). However, in some embodiments, only one or two phases may be connected. Configurations including more conductor assemblies and more phases may be provided.

Referring to FIG. 1H, the one or more bus connector 120A, 120B, 120C may be attached to one or more respective line terminal of the circuit interconnect device 105 by bus conductor bar straps 122A, 122B, and 122C. The bus conductor bar straps 122A, 122B, and 122C may be manufactured from a conductive material, such as a copper or aluminum material. Other electrically conductive materials may be used. The bus conductor bar straps 122A, 122B, and 122C may include a configuration that is J-shaped, where a second portion of each strap is bent back and lies over a first portion. The bus conductor bar straps 122A, 122B, and 122C may each comprise multiple bars in some embodiments. The one or more bus connector 120A, 120B, 120C may connect to the bus conductor bar straps 122A, 122B, 122C by suitable fastening means, such as bolts, screws, rivets, braising, or the like. The bus conductor bar straps 122A, 122B, and 122C may connect to the one or more line terminal of the circuit interconnect device 105 by suitable fastening means, such as bolts, screws, slide-in connections or the like. Optionally, the bus conductor bar straps 122A, 122B, and 122C may be made integral with the one or more line terminal.

Figure 1I:
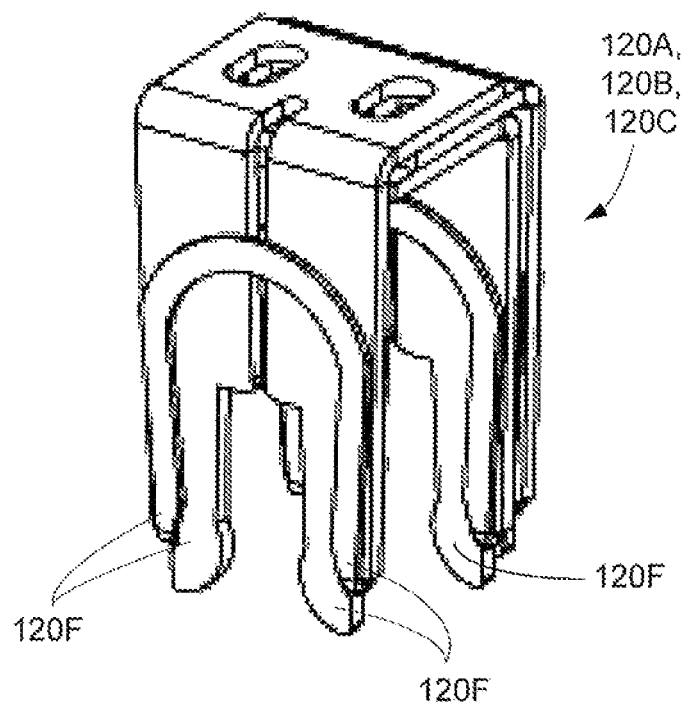
FIG. 1I illustrates isometric views of a bus connector of a circuit interconnect attaching apparatus according to embodiments.

As shown in FIG. 1I, the bus connectors 120A, 120B, 120C may each comprise clips having opposed fingers 120F. One, two, or even three or more sets of fingers 120F may be provided on each bus connector 120A, 120B, 120C. The bus connector 120A, 120B, 120C may be manufactured from a conductive material, such as a copper material.

Referring to FIGS. 1B and 1C, portions of each of the line conductor assemblies 119A, 119B, and 119C may be received in one or more pocket 104A, 104B, 104C which are formed in the body 104 as shown in FIGS. 1B, 1C. Walls 104W may separate the pockets 104A, 104B, and 104C. One or more opening (not shown) can be included in the one or more pocket 104A, 104B, and 104C that can be configured to receive the one or more bus connector 120A, 120B, 120C therein. Each bus connector 120A, 120B, 120C (see FIG. 1H) extends through an opening (not shown) in the body 104 and is oriented to receive a bus bar 124A, 124B, 124C (see FIGS. 2A-B).

In the embodiment shown FIG. 1C, the circuit interconnect device 105 may be coupled to the body 104 by suitable fasteners received through mounting holes 104H. As best shown in FIG. 1D, insulator sheaths 123A, 123B, 123C may extend from a under surface 104U of the body 104. The insulator sheaths 123A, 123B, 123C may at least partially surround the sides of the bus connectors 120A, 120B, 120C and act as an insulator between adjacent bus connectors 120A, 120B, 120C. FIG. 1D shows the side recesses 123RA, 123RB, 123RC in the insulator sheaths 123A, 123B, 123C that allow the busses 124A, 124B, and 124C to pass through and connect to the bus connectors 120A, 120B, 120C.

Figure 2A:
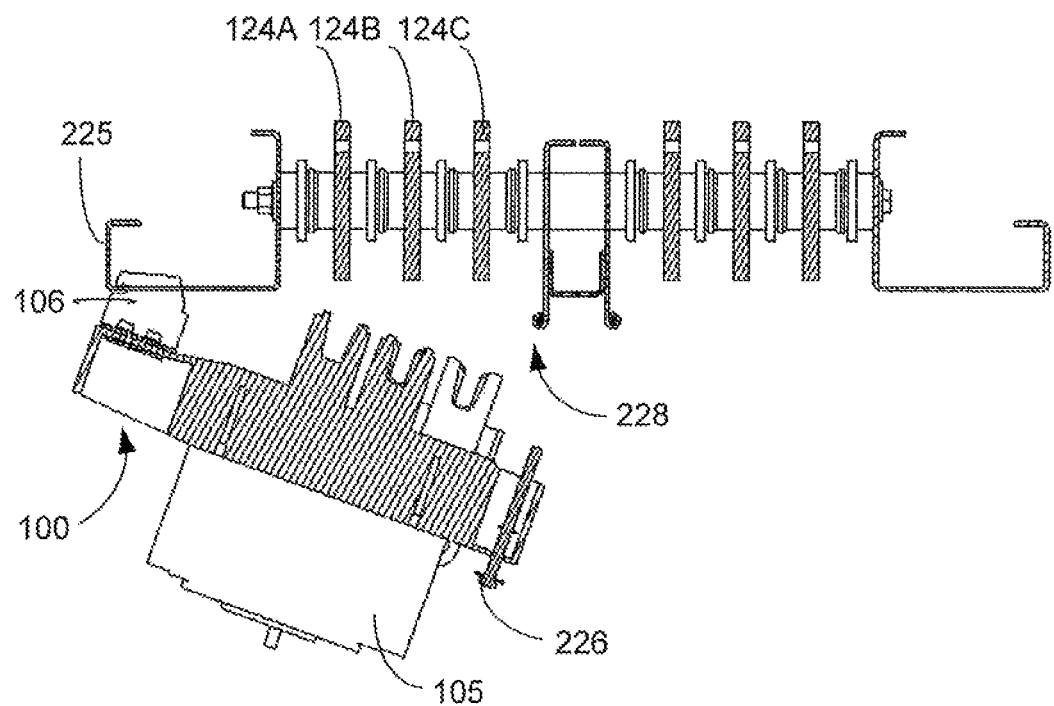
FIG. 2A illustrates a cross-sectioned top view of a circuit interconnect attaching assembly in a disconnected (un-rotated or un-plugged) configuration according to embodiments.
Figure 2B:
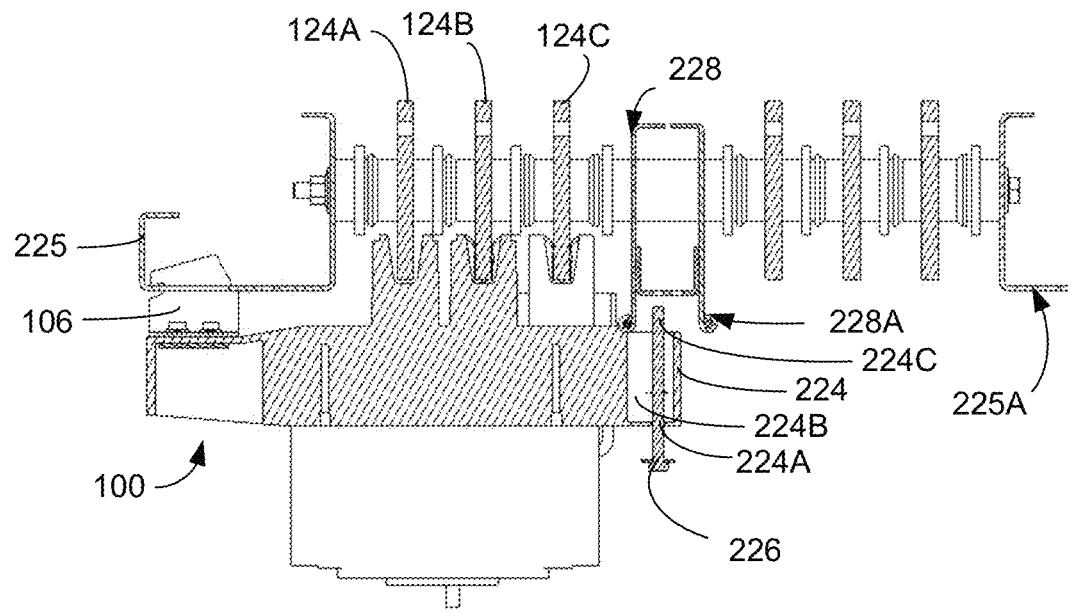
FIG. 2B illustrates a cross-sectioned top view of a circuit interconnect attaching assembly in a connected (rotated or plugged) configuration with the fastener unfastened, according to embodiments.

As shown in FIGS. 2A and 2B, the circuit interconnect attaching apparatus 100 is part of a circuit interconnect attaching assembly 201 (see FIG. 2D) and is configured to connect the circuit interconnect device 105 to, or disconnect the circuit interconnect device 105 from, the one or more bus bar 124A, 124B, 124C. The connecting (FIG. 2B) or disconnecting (FIG. 2A) is responsive to rotation, such as by a user moving (e.g., rotating clockwise or counterclockwise) the interconnect attaching apparatus 100. Such rotation using the circuit interconnect attaching apparatus 100 can be accomplished very rapidly, and without disturbing the surrounding circuit interconnect devices.

In more detail, to accomplish the rotation, the circuit interconnect attaching assembly 201 (see FIG. 2D) includes the circuit interconnect attaching apparatus 100, a first frame rail 225 having a plurality of connection features 230, such as a plurality of laterally-extending notches, and a second frame rail 228, i.e., can be considered a center frame rail. However, the second frame rail is not limited to being a center frame, but could also be another frame rail located in a different location.

Figure 2C:
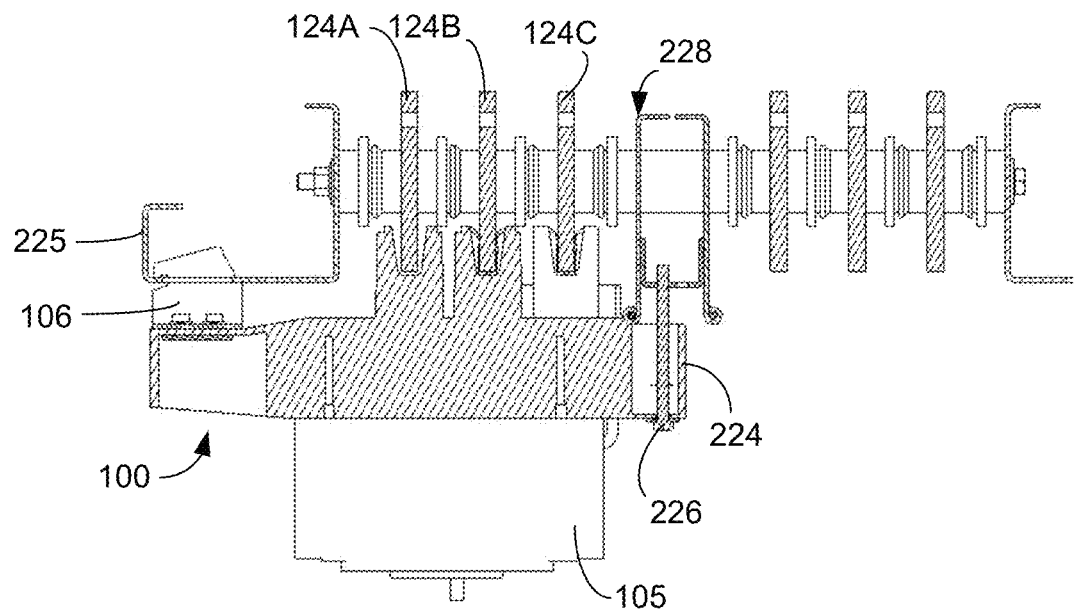
FIG. 2C illustrates a cross-sectioned top view of a circuit interconnect attaching assembly in a connected (rotated or plugged) configuration with the fastener fastened, according to embodiments.
Figure 2D:
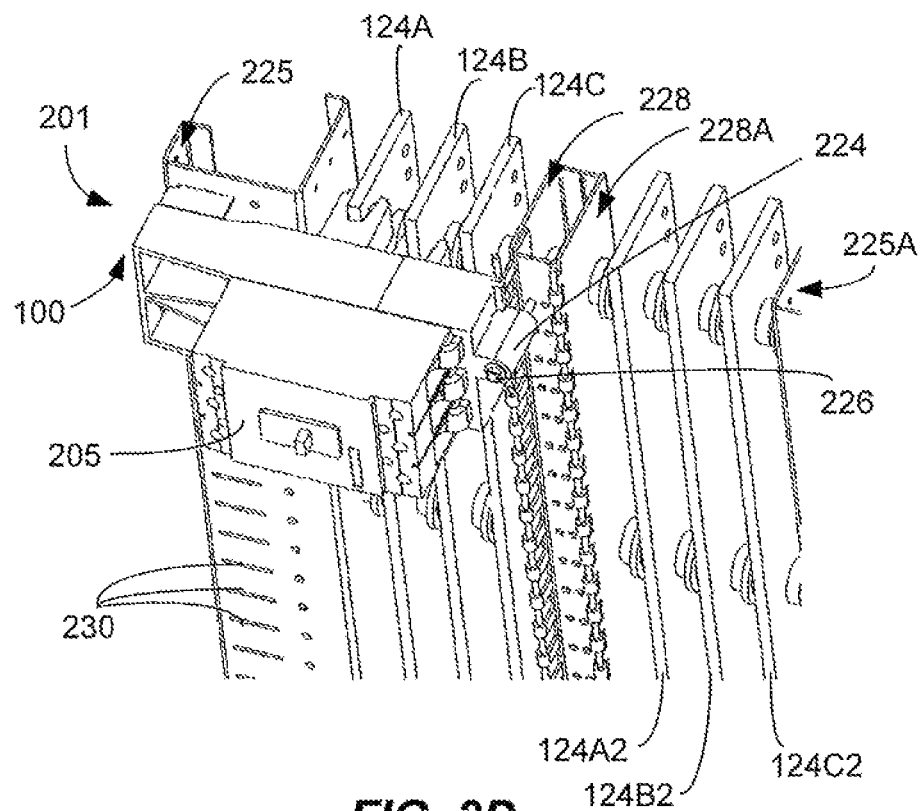
FIG. 2D illustrates an isometric view of a circuit interconnect attaching assembly having a connected (rotated or plugged) circuit interconnect attaching apparatus with the fastener fastened according to embodiments.

In FIGS. 2A-2D, detailed views of an embodiment of the second frame rail 228 are shown. Referring now to FIG. 2D (end segments shown), the second frame rail 228 is adapted to couple to a frame (not shown) or, in one alternative, couple directly to a panelboard or switchboard (not shown). A fastener 226 is shown in FIGS. 2A-2D that extends through a tab portion 224 of the body 100. FIG. 2B shows the tab portion 224 having a first opening 224A, a cavity 224B and a second opening 224C. It is noted the fastener could be more than one fastener and from a group of one of a bolt, a captive fastener, a quarter turn member, a ball detent pin, or a securing clip device.

As shown in FIG. 2D, this circuit interconnect attaching assembly 201 can allow for numerous circuit interconnect devices, such as circuit interconnect device 205 (e.g., having a 250A frame rating). The circuit interconnect device 205, and others, may be quickly connected to or unconnected from the bus bars 124A, 124B, 124C, which may carry A, B, and C phases of electricity, and also to and from bus bars 124A2, 124B2, 124C2, which may also carry A, B, and C phases of electricity. The circuit interconnect attaching assembly can include a second set of frame rails identical to, but reversed from, the frame rails 225, 228 (see 225A, 228A of FIGS. 2B and 2D). In this way, circuit interconnect devices may be installed and uninstalled on either side of the panelboard or switchboard (frame and box not shown for clarity). As can be seen, the circuit interconnect attaching apparatus 100 may be adapted to be used with circuit interconnect devices having different sizes, different type, different rating, and different orientations (see FIG. 4).

Figure 3:
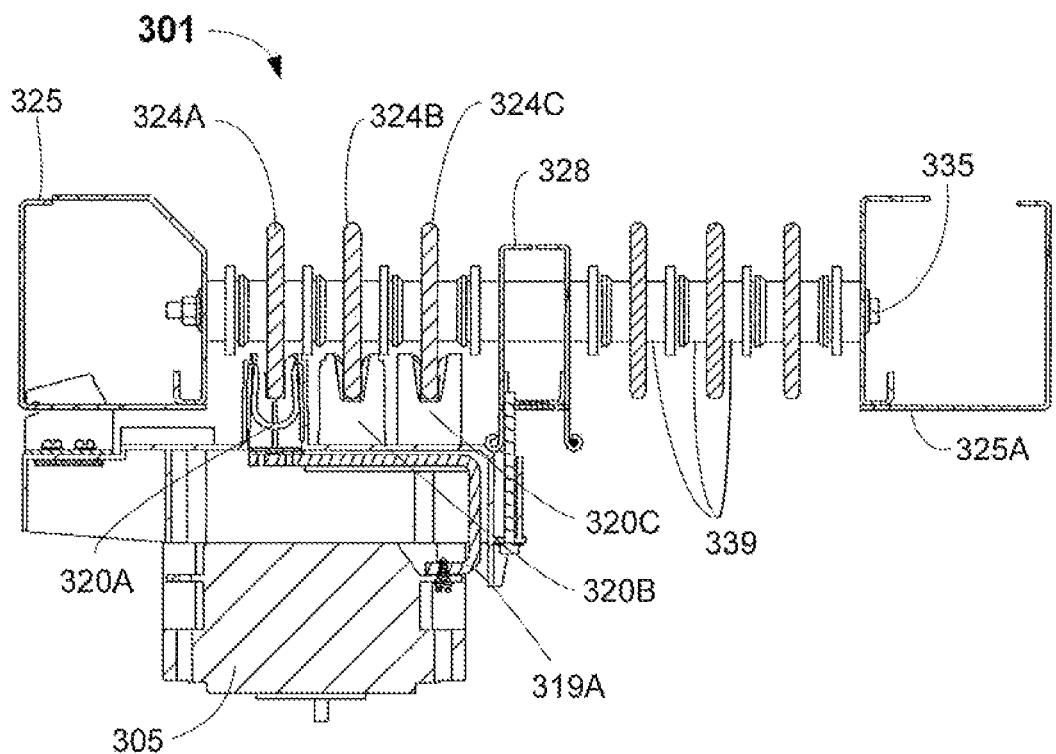
FIG. 3 illustrates a cross-sectioned top view of a circuit interconnect attaching assembly according to embodiments.

FIG. 3 illustrates a cross-sectional view through a circuit interconnect attaching assembly 301 that includes a circuit interconnect device 305 that is configured for front connection. The connection to the first and second frame rails 325, 328 are shown. Further, the connection from the electric bus 324A through the connector assembly 319A is shown." Wherein, bus connectors 320A, 320B, 320C (e.g., spring-loaded clips) are adapted to electrically connect to conductor bars (e.g., bus bars 324A, 324B and 324C). The circuit interconnect attaching assembly 301 may be coupled to a frame structure (not shown), which may be part of, or coupled to, a container such as a switchboard or panelboard by any suitable means such as bolting or the like.

The various center frame and bus components may be connected to the frame rails 325, 325A by insulators 339 (a few labeled) and a through bolt 335 that can be positioned inside an insulator tube (not shown).

Figure 4A:
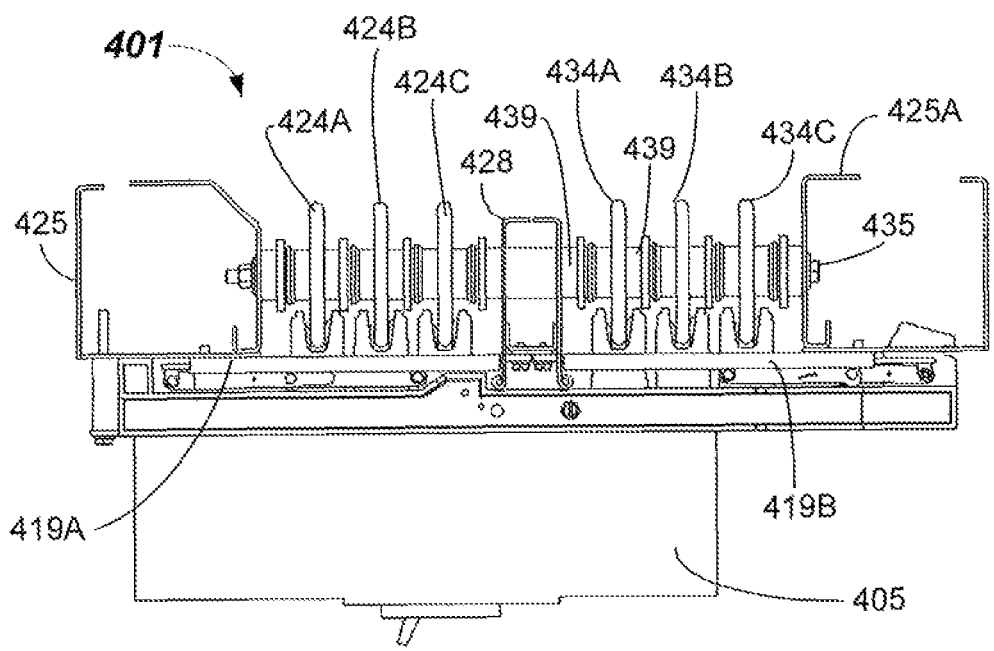
FIG. 4A illustrates a view of a large circuit interconnect attaching assembly according to embodiments.
Figure 4B:
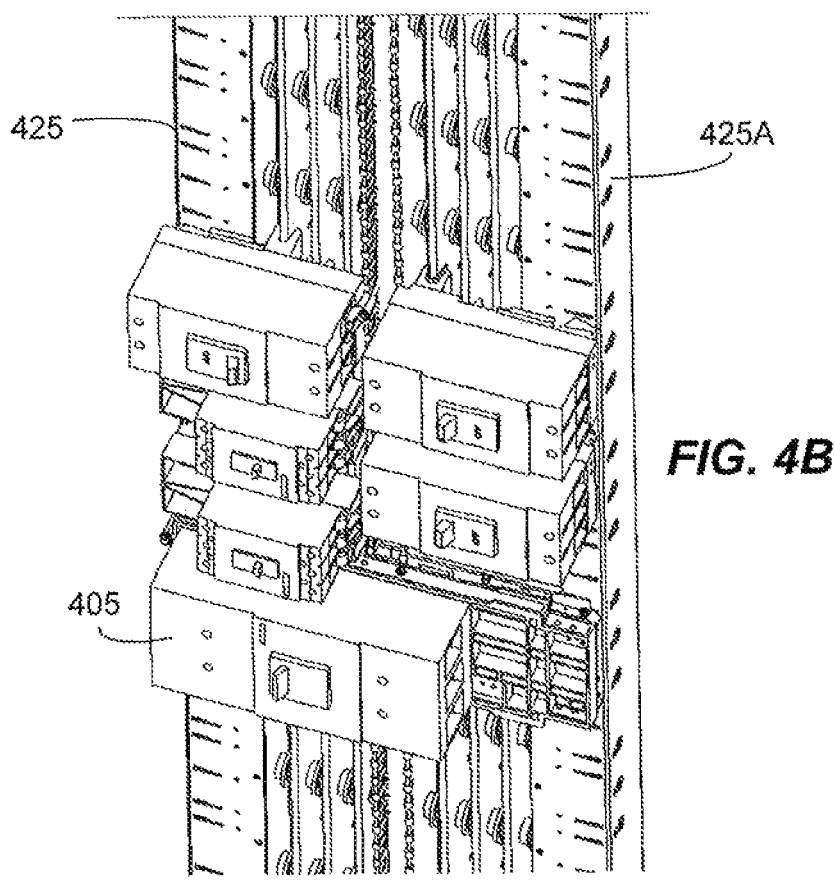
FIG. 4B illustrates an isometric view of a large circuit interconnect attaching assembly connected (rotated or plugged) according to embodiments.

Referring now to FIGS. 4A and 4B, FIG. 4A illustrates a view of a large circuit interconnect attaching assembly 401 that includes a circuit interconnect device 405 configured for a front connection. FIG. 4A shows both a left-side connection and a right-side connection, wherein a connection to the first, second and third frame rails 425, 428, 425A are shown.

Still referring to FIGS. 4A and 4B, the large circuit interconnect attaching assembly 401 may be coupled to a frame structure as shown in FIG. 4B, which may be part of, or coupled to, a container such as a switchboard or panelboard by any suitable means such as bolting or the like. The various center frame and bus components 424A, 424B, 424C, 434A, 434B, and 434C may be connected to the frame rails 425, 425A by insulators 439 (a few labeled) and a through bolt 435 that is positioned inside an insulator tube (not shown).

Figure 5:
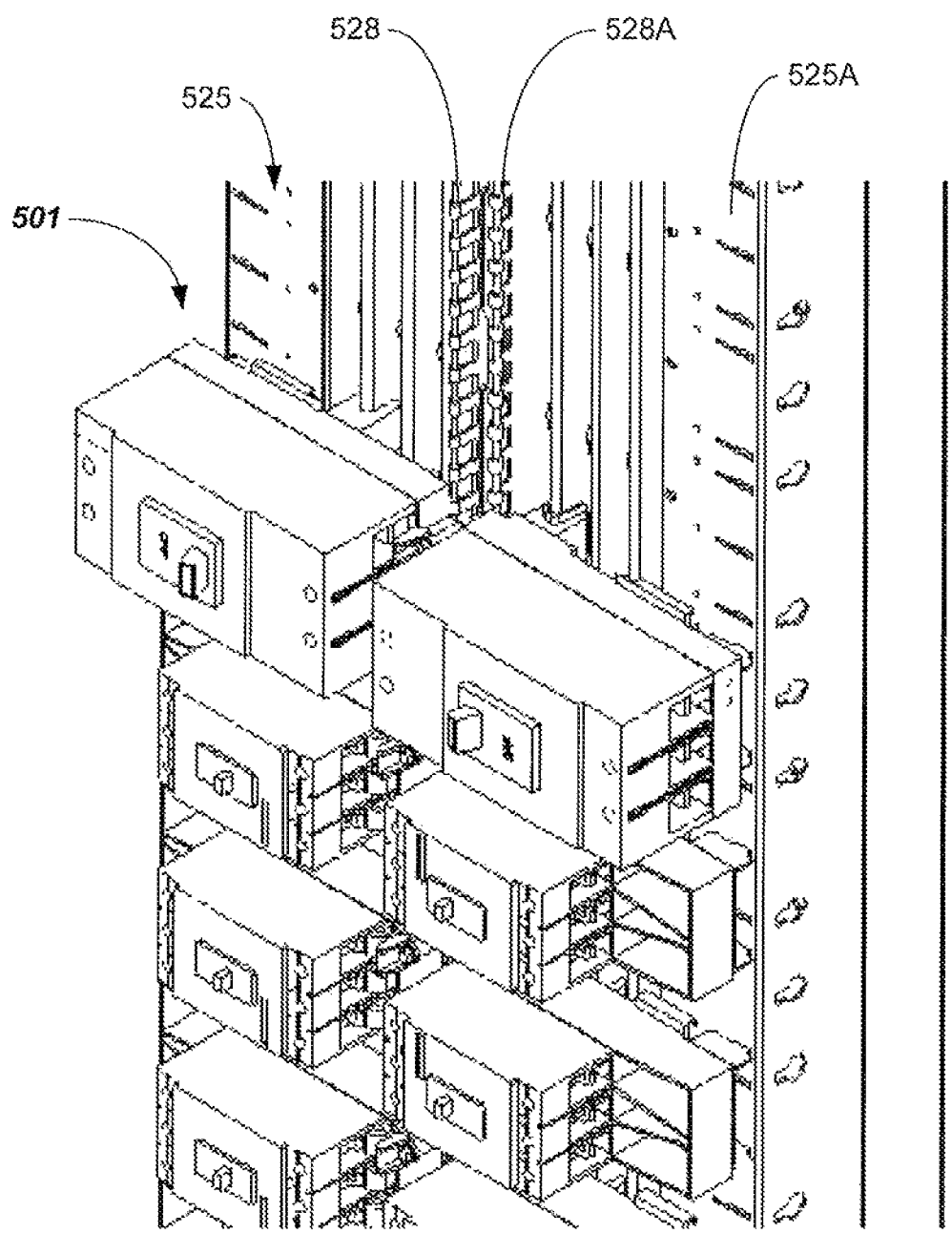
FIG. 5 illustrates an isometric view of a circuit interconnect attaching assembly having numerous different types, orientations and sizes of devices and circuit interconnect attaching apparatus connected (rotated or plugged) according to embodiments.

FIG. 5 illustrates a circuit interconnect attaching assembly 501 and illustrates the versatility of an embodiment of the present disclosed subject matter and the ease by which various circuit interconnect devices may be connected and unconnected. As can be seen, various sizes, types, and orientations of circuit interconnect devices may be installed or uninstalled using one or more embodiment of the circuit interconnect attaching apparatus (e.g., circuit interconnect attaching apparatus) described herein. Embodiments are shown with left-side connection or right-side connection. Connection of the various circuit interconnect attaching apparatus may be between a left-side frame rail 525 and a center frame rail 528 or 528A, between a right-side frame rail 525A and a center frame rail 528 or 528A, and between left-side frame rail 525 and a right-side frame rail 525A in some embodiments.

Figure 6:
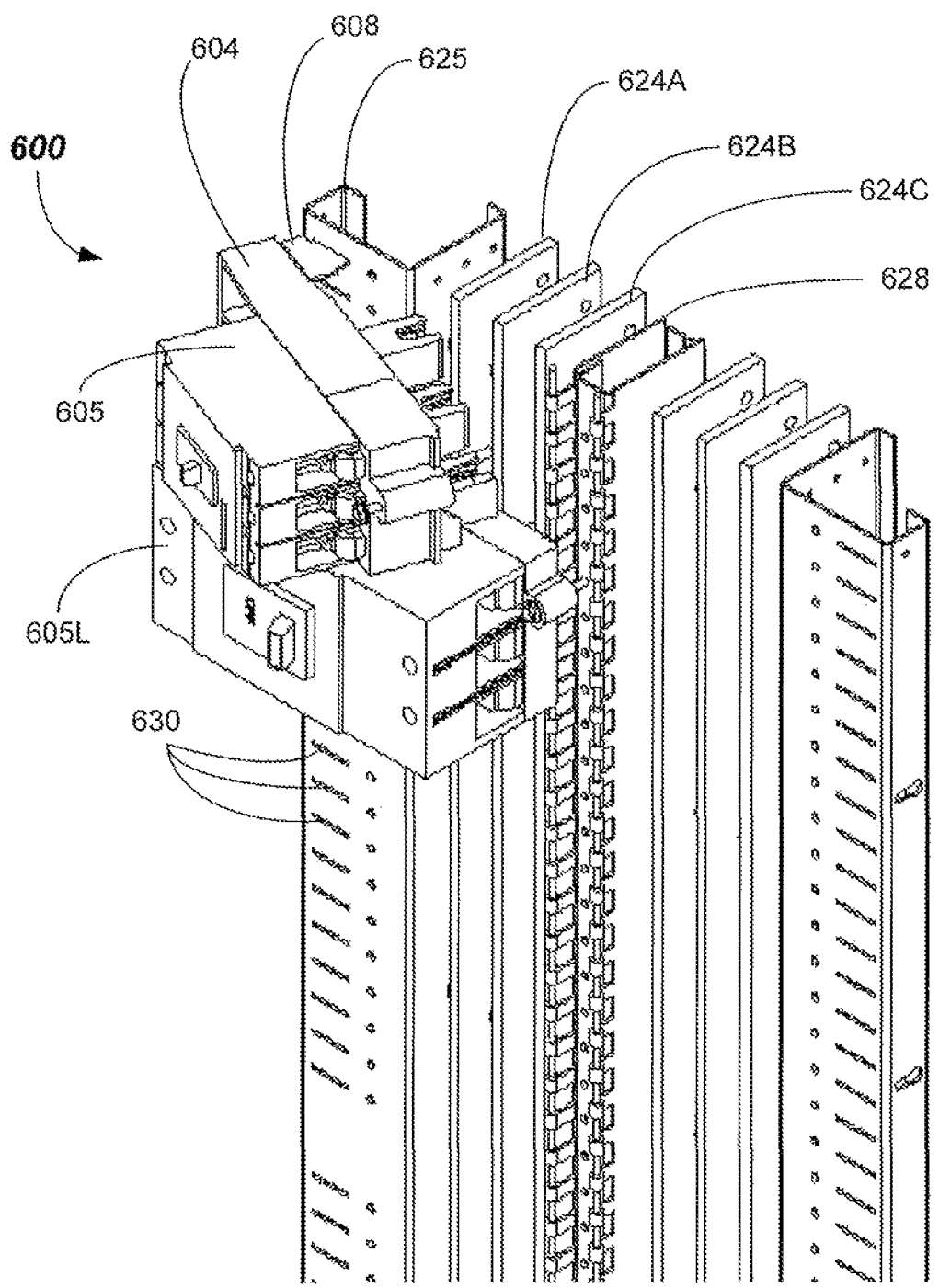
FIG. 6 illustrates an isometric view of two circuit interconnect attaching apparatus, one positioned to be unrotated or unplugged on, and the second positioned to be rotated or plugged on according to embodiments.

FIG. 6 illustrates a starting position for a circuit interconnect device 605, body 604 and attaching apparatus 600 to be rotated onto one or more bus bar (three bus bars 624A, 624B, and 624C shown). The circuit interconnect device 605, body 604 and attaching apparatus 600 will be initially slightly tilted relative to the frame rail 625, as shown. The frame connectors 608 and 606 (not shown) are inserted into the connection features 630, and the assembly 600 is rotated towards the second rail 628 (e.g., center rail). The assembly 600 is further rotated until the circuit interconnect device 605 is fully rotated, as shown in FIG. 2C, for example, and as shown for the circuit interconnect device 605L mounted directly below the circuit interconnect device 605.

FIGS. 7A-7D illustrate another embodiment of circuit interconnect attaching assembly 701 including a circuit interconnect attaching apparatus 700 that includes the ability to connect to and disconnect from one or more load conductor 741 (e.g., one or more runback) on a load side. The illustrated circuit interconnect attaching apparatus 700 also includes, as have previous embodiments, the ability to connect to and disconnect from one or more conductor bar, such as bus bars 724A, 724B, and 724C on a line side. In the depicted embodiment, the attaching apparatus 700 may include one or more load conductor assembly (see reference number 842 of FIG. 8A) that connects to the one or more load conductor 741, such as for front and rear connected applications.

Figure 7A:
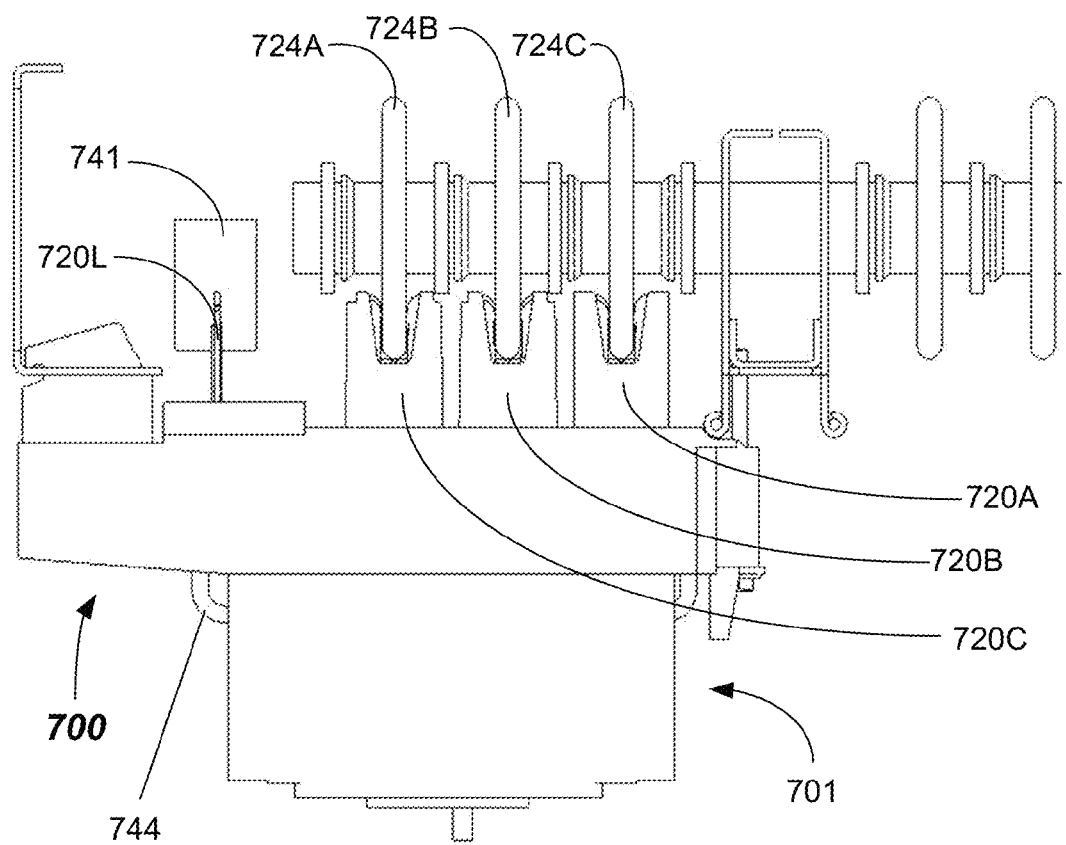
FIGS. 7A and 7B illustrate views of a circuit interconnect attaching apparatus shown in a rotated (or plugged) and un-rotated (or unplugged) configuration that exhibits an ability to electrically connect to both one or more line side bus bar and one or more load side conductor according to embodiments.
Figure 7B:
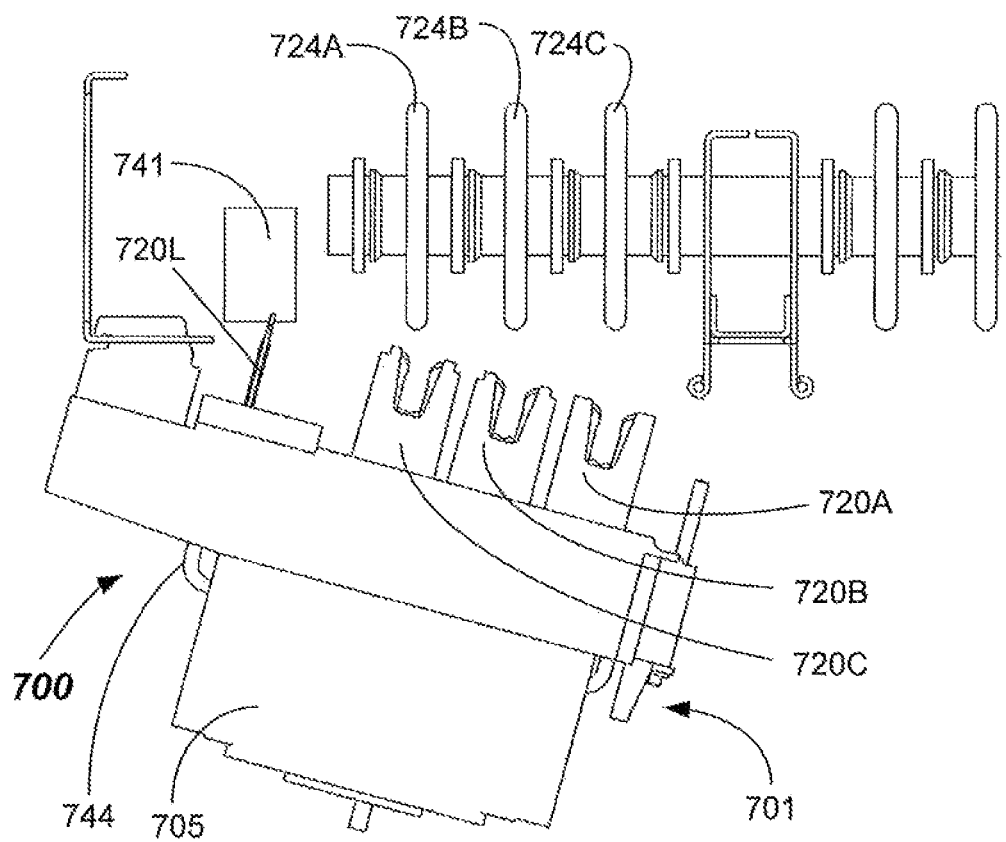
Figure 7C:
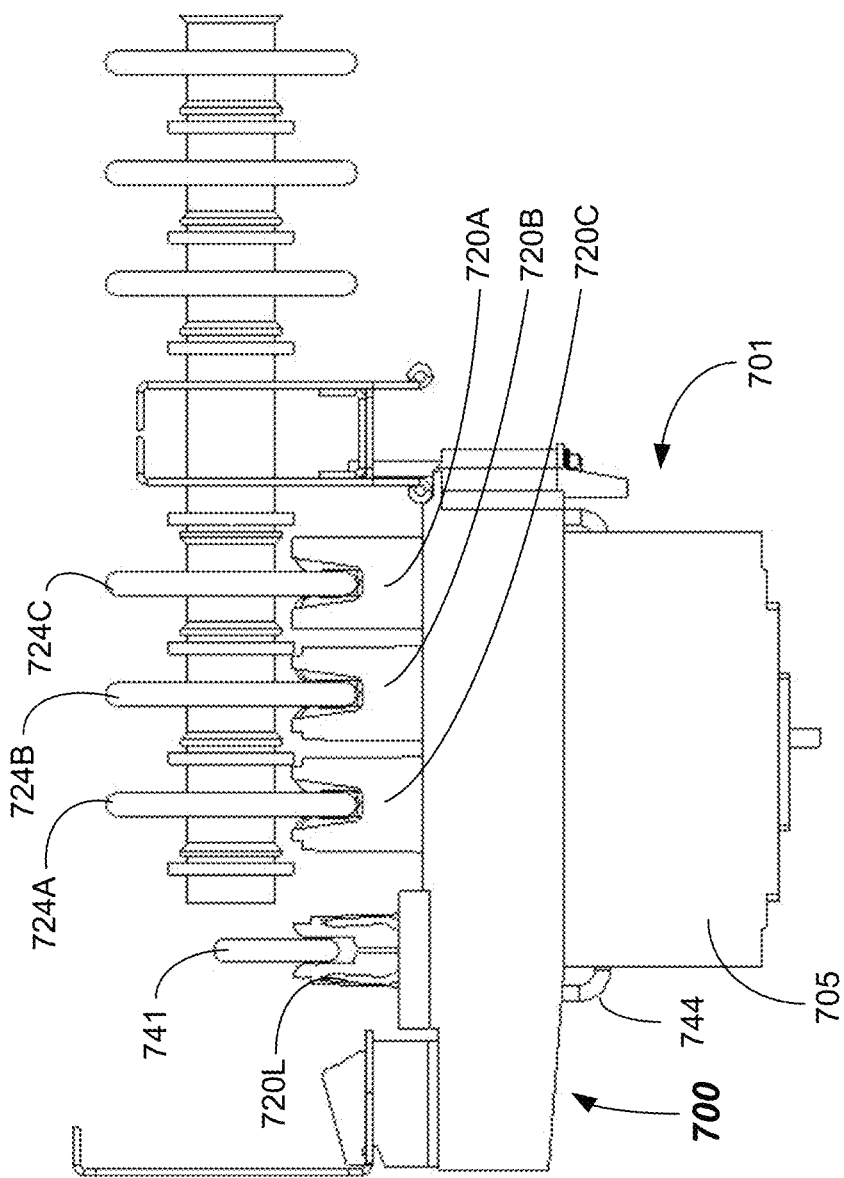
FIGS. 7C and 7D illustrate views of a circuit interconnect attaching apparatus shown in a rotated (or plugged) and un-rotated (or unplugged) configuration that exhibits an ability to electrically-connect to both one or more line side bus bar and one or more load side conductor according to embodiments.
Figure 7D:
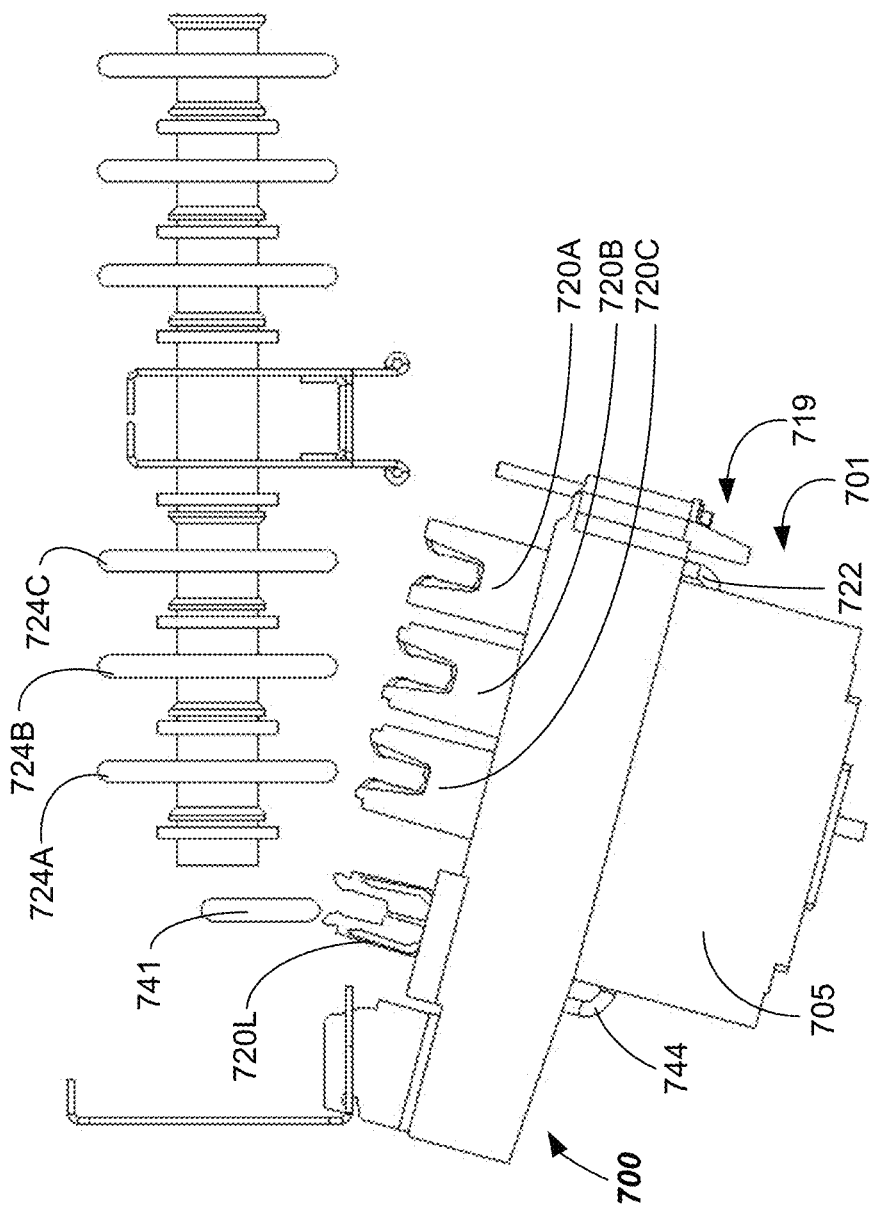

Referring to FIGS. 7A-7D, one or more load conductor bar straps 744 can connect the load terminals of the circuit interconnect device 705 to one or more load conductor connectors 720L (e.g., clips). The one or more load conductor connector 720L may be identical to the bus conductor connector 720A, 720B, 720C, which are the same as described and shown in FIG. 1I. Thus, responsive to rotation of the circuit interconnect device 705, the one or more load conductor connector 720L may be plugged onto one or more load conductor 741 (e.g., one or more runback bar conductor) on a load side. Likewise, the one or more line conductor assembly 719 may include, as shown in FIG. 7D, one or more line conductor bar strap 722 that connects one or more line terminal of the circuit interconnect device 705 to one or more line conductor connector 720A, 720B, 720C (e.g., clips).

Figure 8A:
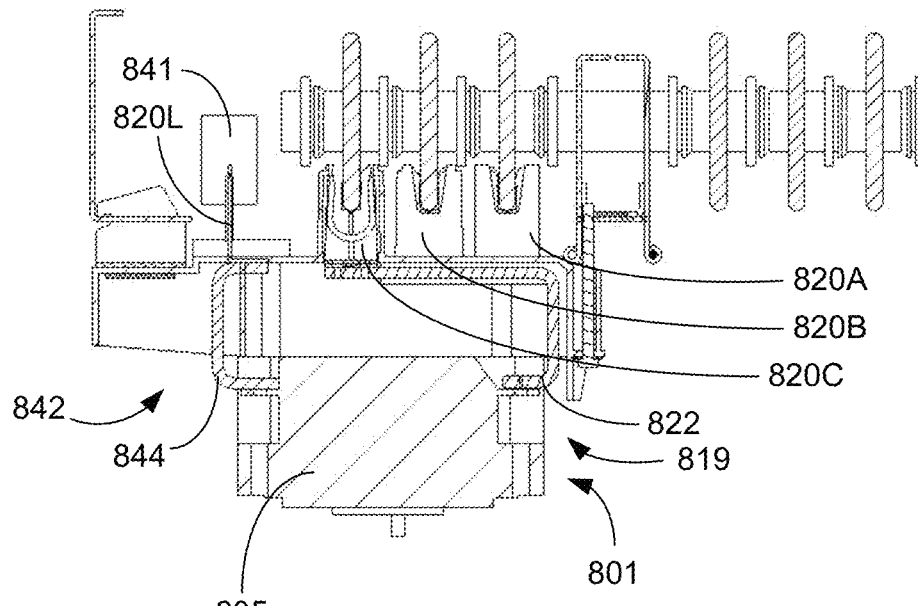
FIGS. 8A and 8B illustrate cross-sectioned top views of a circuit interconnect attaching apparatus having an ability to electrically connect to both the one or more line side bus bars and the one or more load side conductor according to embodiments.
Figure 8B:
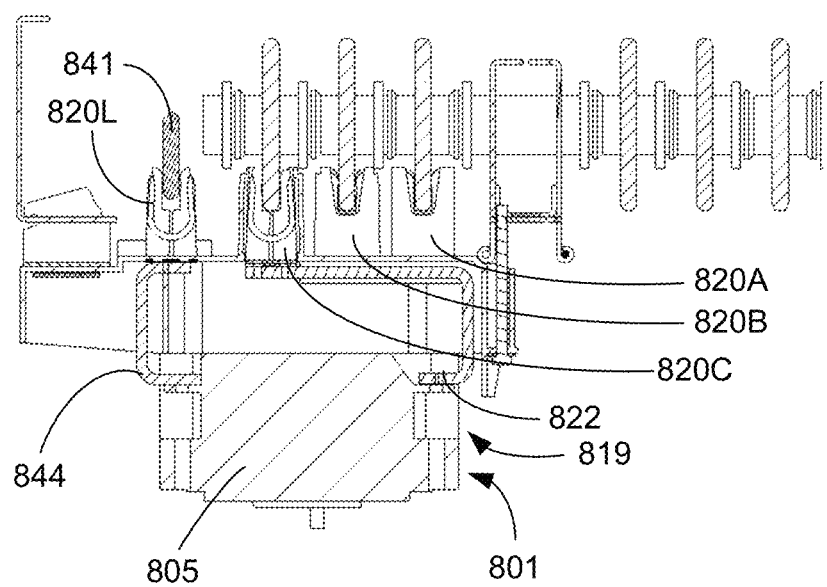

Referring to FIGS. 8A and 8B, the one or more load conductor assembly 842 may include, as shown in FIG. 8A, one or more load conductor bar strap 844 that connect load terminals of the circuit interconnect device 805 to one or more load conductor connector 820L (e.g., clips). The one or more load conductor connector 820L may be identical to the bus conductor connectors 820A, 820B, 820C, which are the same as described and shown in FIG. 1I. Thus, responsive to rotation of the circuit interconnect attaching assembly 801, the one or more load conductor connector 820L may be plugged onto one or more load conductor 841 (e.g., one or more runback bar conductor) on a load side. Likewise, the one or more line conductor assembly 819 may include one or more line conductor bar strap 822 that connect one or more line terminal of the circuit interconnect device 805 to one or more line conductor connector 820A, 820B, 820C (e.g., clips).

Figure 9A:
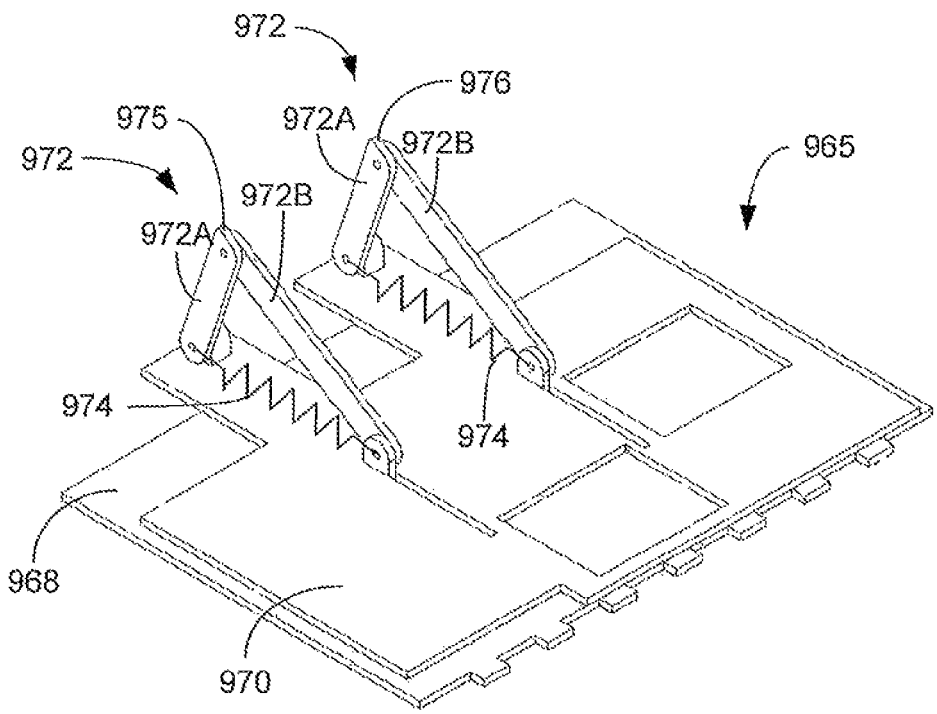
FIG. 9A illustrates an isometric view of a shutter apparatus configured to close off access to bus bars when a circuit interconnect attaching apparatus is un-rotated (or unplugged) or not present, shown in a closed configuration according to embodiments.
Figure 9B:
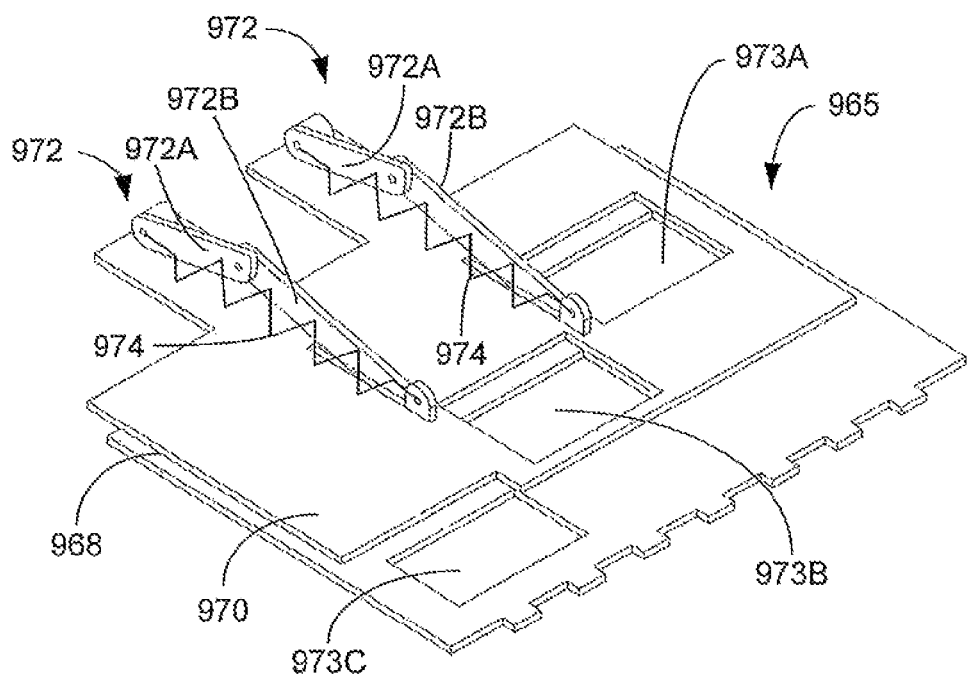
FIG. 9B illustrates an isometric view of a shutter apparatus configured to allow access to bus bars when a circuit interconnect attaching apparatus is being rotated (or plugged), shown in a opened configuration according to embodiments.
Figure 9C:
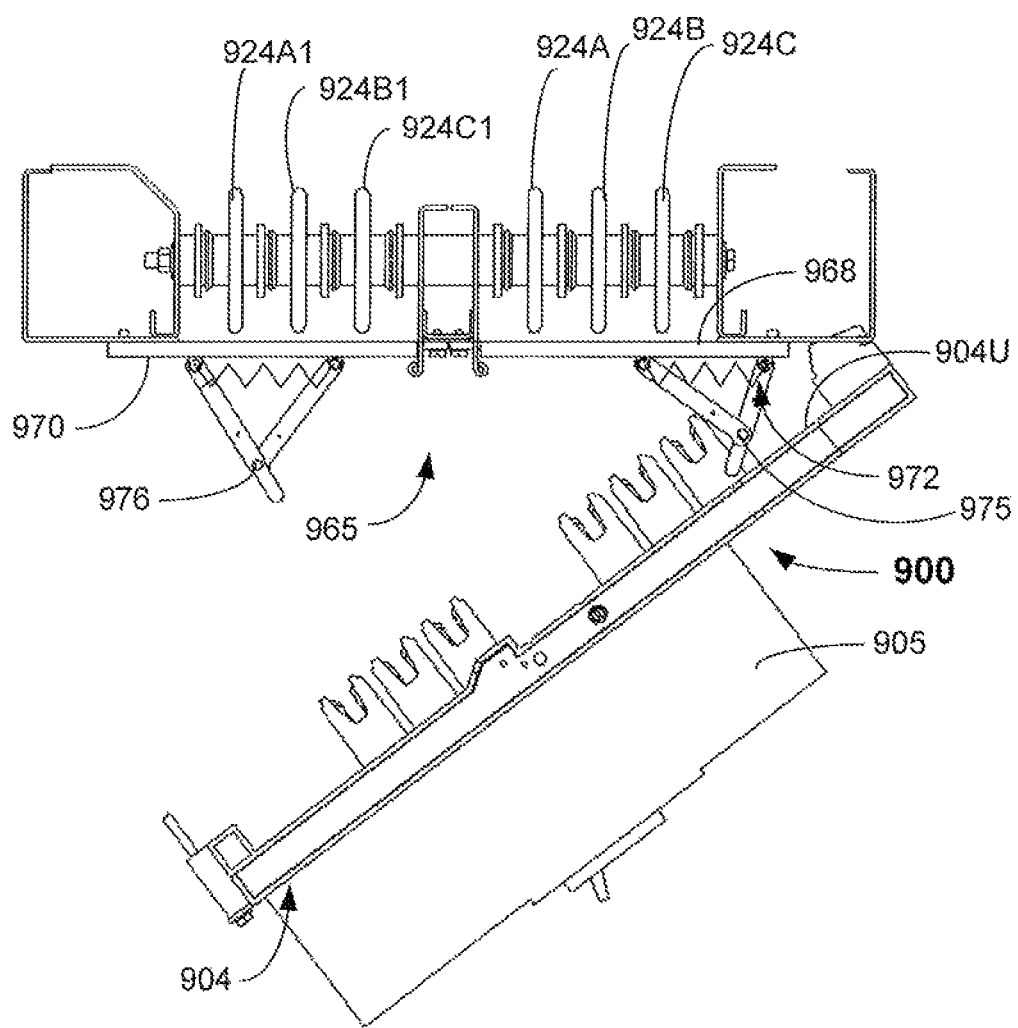
FIG. 9C illustrates a bottom view of one or more shutter apparatus engaging a circuit interconnect attaching apparatus according to embodiments.

FIGS. 9A-9C illustrate a shutter apparatus 965 that may be adapted for use with the circuit interconnect attaching apparatus 900 (see FIG. 9C). The shutter apparatus 965 has a moveable shutter 970 that provides protection against accidental contact with any bare electrical conductors (e.g., bus bars 924A, 924B, 924C (see FIG. 9C) in a compartment when the circuit interconnect device 905 is removed (e.g., un-rotated or unplugged) or not present. FIG. 9C is a top view (e.g., from a bottom side) showing the use of two shutter apparatus 965 according to embodiments. In particular, one apparatus 965 is provided for use with each set of bus bars 924A, 924B, 924C and 924A1 924B1, 924C1, noting that these will not be the same assemblies.

Still referring to FIGS. 9A-C, the shutter apparatus 965 includes a base 968, a shutter 970, and one or more linkage assembly 972. The shutter 970 of the shutter apparatus 965 is configured and operational to be opened by the rotational motion of the body 904 of the attaching apparatus 900 contacting and displacing one or more linkage assembly 972. When the shutter 970 is fully opened, the bus connectors, e.g., clips, can engage the conductors (e.g., one or more bus bar 924A, etc.) through one or more access passage 973A-973C (FIG. 9B). The number of access passages 973A-973C may be equal to the number of phases/bus bars. The shutter apparatus 965 may include one or more spring 974 (e.g., coil springs) that may be connected at suitable locations (e.g., between links 972A, 972B) and may serve to return the shutter 970 to the closed position (FIG. 9A) when the circuit interconnect attaching apparatus 900 and coupled circuit interconnect device 905 are removed (un-rotated).

FIG. 9C shows a circuit interconnect device 905 that may require two shutter apparatus 965 since the circuit interconnect device 905 connects to both sets of line side bus bars 924A, etc. and 924A1, etc. A smaller circuit interconnect device (e.g., small circuit breaker) may only require only one shutter apparatus 965 since it may only engage on one set of line side bus bars (e.g., 924A-924C). As the circuit interconnect device and attaching apparatus 900 rotate toward the plugged on position, an undersurface 904U of the body 904 of the attaching apparatus 900 contacts and displaces the linkage assembly 972 at points 975 and 976. This displacement causes the linkages 972A, 972B to extend outward and open the shutters 970 as shown in FIG. 9B. It is noted that the fastener attaches to the second rail, such that the second rail in this particular embodiment happens to be an outer rail.

Figure 10:
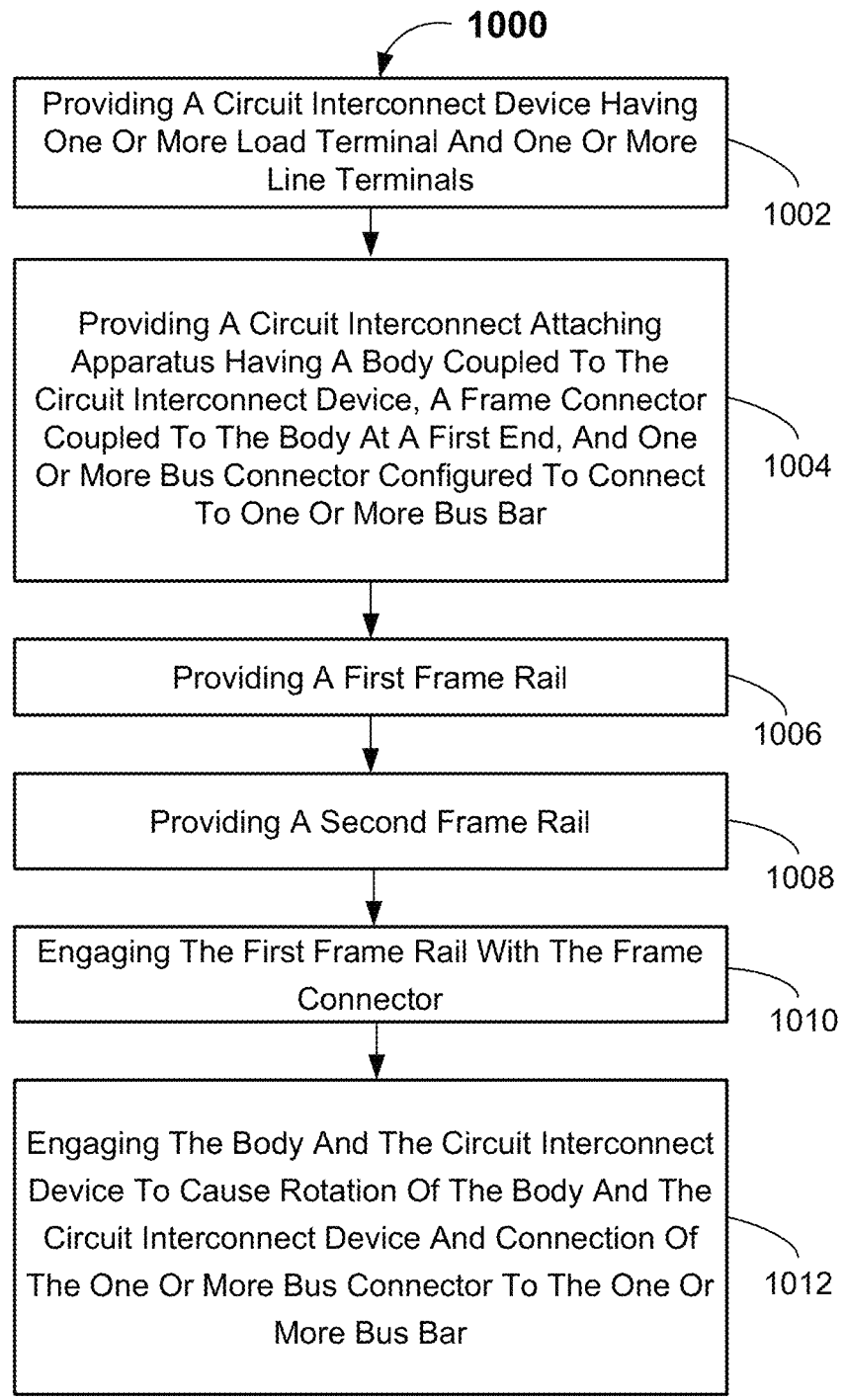
FIG. 10 shows a flowchart illustrating a method of connecting a circuit interconnect device according to embodiments.

FIG. 10 is a flowchart illustrating a method of connecting a circuit interconnect device, such as to one or more bus bar, according to embodiments. The method 1000 includes, in 1002, providing a circuit interconnect device having one or more load terminal and one or more line terminal, in 1004, providing a circuit interconnect attaching apparatus having a body coupled to the circuit interconnect device, a frame connector coupled to the body at a first end, and one or more bus connector configured to connect to one or more bus bar, in 1006 providing a first frame rail, and in 1008, providing a second frame rail. The method further including, in 1010, engaging the first frame rail with the frame connector, and in 1012, engaging the body and the circuit interconnect device to cause rotation of the body and the circuit interconnect device and connection of the one or more bus connector to the one or more bus bar. The rotation may also connect one or more load connector to the one or more load conductor (e.g., runback).

While the subject matter disclosed is susceptible to various modifications and alternative forms, specific embodiments and methods thereof have been shown by way of example in the drawings and are described in detail herein. It should be understood, however, that it is not intended to limit the subject matter disclosed to the particular apparatus, assemblies, or methods disclosed, but, to the contrary, the intention is to cover all modifications, equivalents and alternatives falling within the scope of the subject matter disclosed.

What is claimed is:

1. A circuit interconnect attaching apparatus, comprising:
    a body adapted to couple to a circuit interconnect device, the body having a first end and a second end;
    one or more frame connector coupled to the first end of the body, wherein the one or more frame connector includes one or more recesses configured to enable the one or more frame connector to engagingly rotate with respect to one or more frame rail in operative connection with one or more bus bar;
    at least one tab portion positioned on an outer surface of the second end of the body, wherein the at least one tab portion is adapted for accepting at least one fastener member; and
    one or more bus connector configured to connect to or disconnect from the one or more bus bar responsive to a rotational motion of the body and the circuit interconnect device with the one or more frame connector in rotatable engagement with the one or more frame rail.

2. The circuit interconnect attaching apparatus of claim 1, wherein the circuit interconnect device is one selected from a group consisting of at least one circuit breaker, at least one switch, at least one branch circuit monitor, at least one surge protection device, and at least one lug.

3. The circuit interconnect attaching apparatus of claim 1, comprising one or more line side bus conductor bar strap coupled to the one or more bus connector.

4. The circuit interconnect attaching apparatus of claim 1, comprising one or more load connector configured to connect to or disconnect from one or more load conductor responsive to rotation of the body and the circuit interconnect device.

5. The circuit interconnect attaching apparatus of claim 4 comprising:
    one or more line-side bus conductor bar strap coupled to the one or more bus connector, and
    one or more load conductor bar strap coupled to the one or more load connector.

6. The circuit interconnect attaching apparatus of claim 1, wherein the body comprises at least one pocket configured to receive one or more bus conductor bar strap coupled to the one or more bus connector.

7. The circuit interconnect attaching apparatus of claim 1, wherein the body comprises at least one insulator sheath adapted to at least partially surround the one or more bus connector.

8. The circuit interconnect attaching apparatus of claim 1, comprising a shutter apparatus configured and operational to be opened or closed responsive to a rotational motion of the body.

9. The circuit interconnect attaching apparatus of claim 1, wherein the at least one tab portion includes a cavity having a first opening and a second opening that is adapted for the at least one fastener member to enter there through.

10. The circuit interconnect attaching apparatus of claim 1, wherein the at least one fastening member is from the group consisting of one of a bolt, a captive fastener, a quarter turn member, a ball detent pin, or a securing clip device.

11. The circuit interconnect attaching apparatus of claim 1, wherein the circuit interconnect device includes:
    one or more line terminal connected to one or more line-side bus conductor bar strap; and
    one or more load terminal coupled to one or more load conductor bar strap, such that the one or more load conductor bar strap is coupled to one or more load connectors.

12. A circuit interconnect attaching assembly, comprising:
    a body adapted to couple to a circuit interconnect device, the body includes at least one tab portion coupled to an outer surface of the body;
    one or more frame connector coupled to a first end of the body;
    one or more bus connector configured to connect to one or more bus bar responsive to a rotational motion of the body and the circuit interconnect device;
    a universal circuit interconnect device frame rail assembly for securing the body and the circuit interconnect device;
    a first frame rail of the universal circuit interconnect device frame rail assembly comprises at least one hole or slot adapted to receive the one or more frame connector at the first end of the body; and
    a second frame rail of the universal circuit interconnect device frame rail assembly having one or more hole or slot for accepting at least one fastener member for securing the body and circuit interconnect device to the second frame rail via the at least one tab portion positioned on an outer surface of a second end of the body, the at least one fastener member coupled to an axis generally perpendicular to a mating surface of the second frame rail.

13. A circuit interconnect attaching apparatus, comprising:
    a body adapted to couple to a circuit interconnect device, the body having a first end and a second end;
    one or more frame connector coupled to the first end of the body;
    at least one tab portion positioned on an outer surface of the second end of the body, wherein the at least one tab portion is adapted for accepting at least one fastener member; and
    one or more bus connector configured to connect to or disconnect from one or more bus bar responsive to a rotational motion of the body and the circuit interconnect device,
    wherein the body comprises one or more pocket, each pocket is configured to receive a bus conductor bar strap, and one or more opening from the one or more pocket is configured to receive the one or more bus connector.

14. The circuit interconnect attaching assembly of claim 12, wherein the at least one fastener member is in communication with the at least one opening and a cavity of the second frame rail while coupled to the second frame rail.

15. The circuit interconnect attaching assembly of claim 12, wherein the at least one tab portion includes a cavity having a first opening and a second opening for the at least one fastener member to be in communication while coupled to the second frame rail.

16. The circuit interconnect attaching assembly of claim 12, wherein the universal circuit interconnect device frame rail assembly is adapted for securing a plurality of circuit interconnect device assemblies onto the second frame rail by offsetting a fastener member location of a first circuit interconnect device assembly with a second fastener member location of a second circuit interconnect device assembly.

17. The circuit interconnect attaching assembly of claim 12, comprising one or more line side bus conductor bar strap coupled to the one or more bus connector.

18. The circuit interconnect attaching assembly of claim 12, comprising one or more load connector configured to connect to or disconnect from one or more load conductor responsive to a rotational motion of the body and the circuit interconnect device.

19. The circuit interconnect attaching assembly of claim 12, comprising:
   one or more line-side bus conductor bar strap coupled to the one or more bus connector, and
   one or more load conductor bar strap coupled to one or more load connector.

20. The circuit interconnect attaching assembly of claim 12, comprising a shutter apparatus configured and operational to be opened by a rotational motion of the body.

21. The circuit interconnect attaching assembly of claim 12, a circuit interconnect device having one or more line terminal and one or more load terminal, the one or more load terminal is in communication with one or more load strap, and one or more bus conductor bar strap is connected to the one or more line terminal.

22. A method of connecting a circuit interconnect device, comprising:
   providing the circuit interconnect device including one of one or more load terminal, one or more line terminal, or both;
   providing a body coupled to the circuit interconnect device, the body having one or more frame connector coupled to a first end and at least one tab portion coupled to a second end;
   providing at least one fastener member in communication the at least one tab portion;
   providing one or more bus connector configured to connect to one or more bus bar;
   providing a universal circuit interconnect device frame rail assembly for securing the body and the circuit interconnect device, the universal circuit interconnect device frame rail assembly including a first frame rail having at least one hole or slot, and a second frame rail having at least one hole or slot;
   engaging the first frame rail with the one or more frame connector at the first end of the body;
   rotating the body and the circuit interconnect device in a rotational motion or pivoting motion for the one or more bus connector to engage with and connect to the one or more bus bar; and
   engaging the second frame rail with the at least one fastener member for securing the body and circuit interconnect device to the second frame rail, the at least one fastener member coupled to an axis generally perpendicular to a mating surface of the second frame rail.

* * * * *